Nov. 25, 1930.   F. OUDIN ET AL   1,782,439
CLAMPING DEVICE
Filed April 30, 1929   2 Sheets-Sheet 1

Inventors
Ferdinand Oudin &
Benjamin H. Skinner
By  N.A.Tatters  Att'y.

Nov. 25, 1930.    F. OUDIN ET AL    1,782,439
CLAMPING DEVICE
Filed April 30, 1929    2 Sheets-Sheet 2
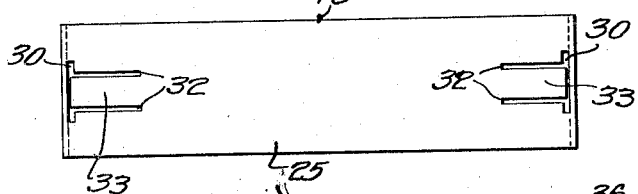
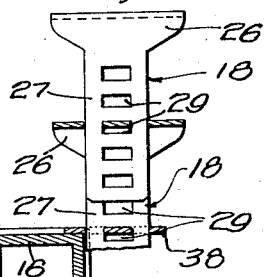
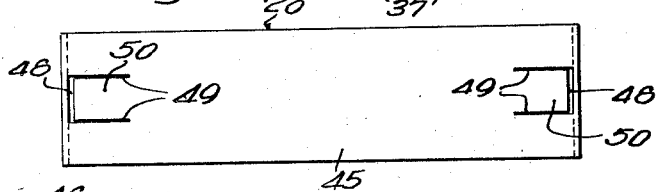
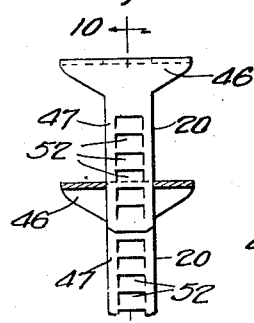
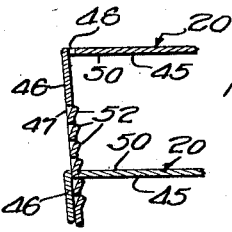
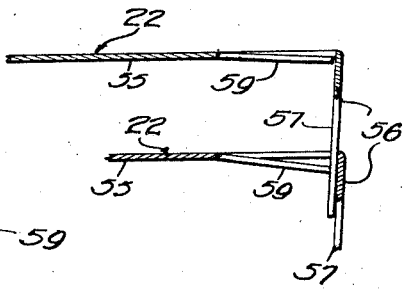
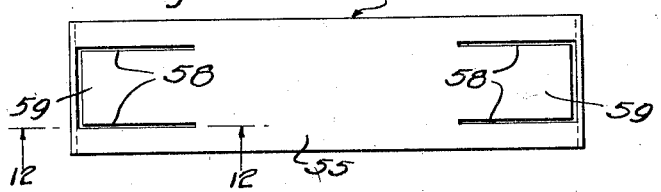
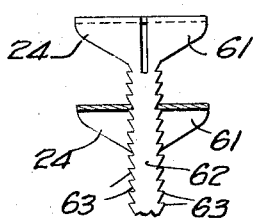
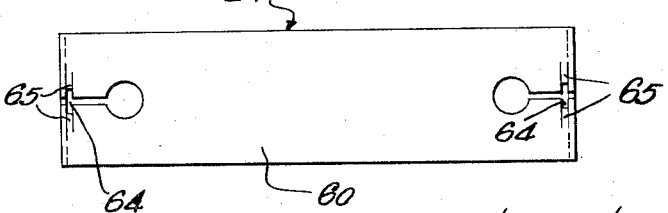
Inventors
Ferdinand Oudin &
Benjamin H. Skinner
By H.W.Patteson
Atty.

Patented Nov. 25, 1930

1,782,439

UNITED STATES PATENT OFFICE

FERDINAND OUDIN, OF RIVERSIDE, AND BENJAMIN HARVEY SKINNER, OF BERWYN, ILLINOIS, ASSIGNORS TO WESTERN ELECTRIC COMPANY, INCORPORATED, OF NEW YORK, N. Y., A CORPORATION OF NEW YORK

CLAMPING DEVICE

Application filed April 30, 1929. Serial No. 359,342.

This invention relates to clamping devices, and more particularly to devices for fastening strands or cables to supports and to each other.

The invention has for its principal object the provision of improved and readily adjustable clamping devices of simple and economical construction for attaching strands or cables to a supporting framework and to each other.

In accordance with the above object, the invention contemplates the provision of improved cable clamping devices consisting of flat metal strip material formed into three sided loop members for surrounding groups of cables and having reduced extremities designed to project into transverse slots of a base member or previously installed clamping device. In one embodiment of the invention, the reduced extremities are provided with a plurality of transverse slots for selective engagement by flexible reed portions of a preceding clamping device or base member to provide vertical adjustment for accommodating various numbers and sizes of cables. In another form of the invention, the extremities are provided on their inner surfaces with a plurality of inwardly projecting teeth for selective engagement by the flexible reed portions of a preceding clamping device or base member. In another embodiment of the invention, the reduced extremities are plane surfaced and are retained in position solely by frictional contact with the flexible reed portions of a previously installed clamping device. In still another form of the invention, the reduced extremities are provided with edge teeth for selective engagement by flexible reed portions of a preceding clamping device or base member.

Figure 1:
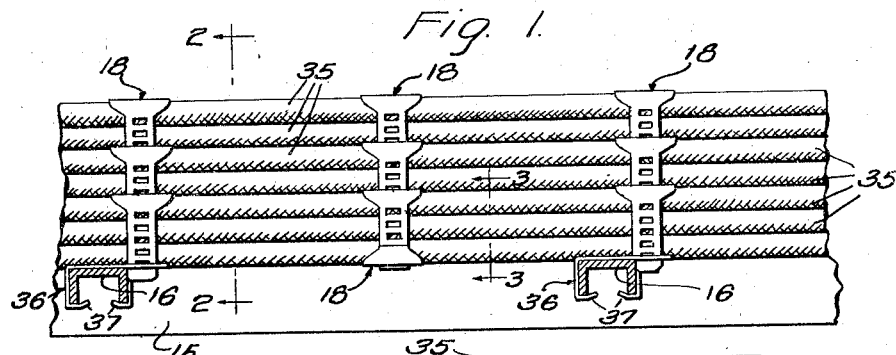
Figure 2:
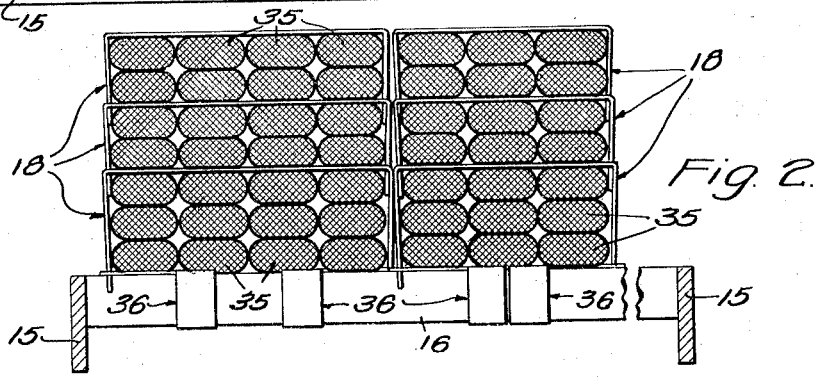
Figure 3:
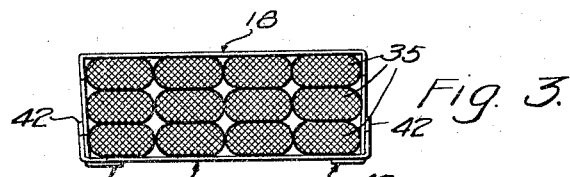
Figures 4, 7:
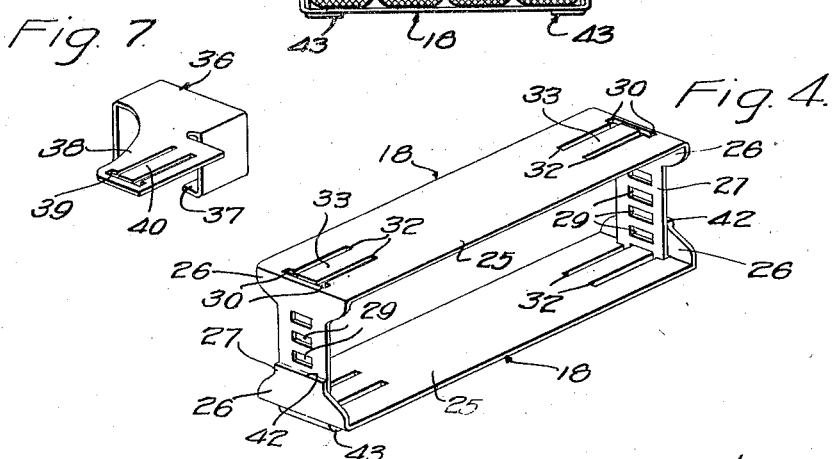

A more complete understanding of the invention will be had from the following detailed description, reference being had to the accompanying drawings, wherein Fig. 1 is a fragmentary side elevational view, partly in section, of a group of cables shown attached to a supporting framework and to each other by means of clamping devices embodying the features of the invention, Fig. 2 is an enlarged transverse section taken on line 2—2 of Fig. 1, Fig. 3 is an enlarged fragmentary section taken on line 3—3 of Fig. 1 showing a plurality of cables clamped together by means of the improved clamping devices, Fig. 4 is an enlarged perspective view of two of the clamping devices shown in Fig. 3, Fig. 5 is a plan view of one form of clamping device embodying the features of the invention, Fig. 6 is an end elevational view, partly in section, or two clamping devices of the type shown in Fig. 5 attached to each other and to a cooperating base clamp, Fig. 7 is a perspective view of the base clamp, Fig. 8 is a plan view of an alternative form of clamping device embodying the features of the invention, Fig. 9 is a fragmentary end elevational view, partly in section, of two interlocked clamping devices of the type shown in Fig. 8, Fig. 10 is a fragmentary vertical section taken on line 10—10 of Fig. 9, Fig. 11 is a plan view of another form of clamping device embodying the features of the invention, Fig. 12 is a fragmentary sectional view of two interlocked clamping devices of the type shown in Fig. 11, Fig. 13 is a plan view of still another form of clamping device, and Fig. 14 is a fragmentary end elevational view, partly in section, of two interlocked clamping devices of the type shown in Fig. 13.

Clamping devices embodying the features of the invention may be employed to advantage in telephone exchanges for attaching the cables of electrical conductors interconnecting the electrical apparatus to a supporting framework. As shown in Figs. 1 and 2, the cable supporting framework may consist of a pair of spaced parallel bars or stringers 15 interconnected by a plurality of spaced cross straps 16, preferably formed of channel iron. The cables are usually attached to the framework with their axes parallel to the stringers 15 and at right angles to the cross channels 16. It will be observed that the clamping devices supporting the first few layers of cables are attached to suitable base members or clamps secured at predetermined positions along the cross channels 16. Additional layers of cables are fastened to the preceding layers by means of clamping devices which are attached to the devices supporting the preceding layers.

In the drawings, several alternative forms of the improved clamping device are shown and designated generally by the reference numerals 18, 20, 22 and 24. It will be observed that each of the several forms consists, essentially, of flat strip material, preferably resilient sheet metal, formed into a three sided or substantially U-shaped member having reduced extremities and provided with means for adjustably engaging a similar member or base clamp to attach a plurality of individual cables or groups of cables of various sizes to each other or to a supporting framework.

The clamping device 18, as shown in detail in Figs. 5 and 6, comprises a flat horizontal portion 25 interconnecting a pair of spaced vertical portions 26, 26 having reduced extremities 27, 27 provided with a plurality of spaced transverse slots 29, 29. The horizontal portion 25 is provided at each end with a transverse slot 30 for accommodating the reduced extremities 27 of another similar device. The horizontal portion 25 is slotted at each end as indicated at 32 to provide longitudinally extending flexible reed portions 33, 33 which extend into the transverse slots 30 and are adapted to selectively engage the transverse slots 29 of the reduced extremities 27 of a similar device to provide vertical adjustment for accommodating various numbers and sizes of cables. This vertical adjustability also provides a simple and efficient means for accommodating slight variations in the dimensions of similar types or sizes of cables, such as may be caused by slight variations in the sizes of the composite conductors or by other variations encountered in commercial manufacturing conditions. Furthermore, the clamping devices automatically adjust themselves to dimensional variations of the cables resulting from the compressing force of superimposed layers of cables.

When employing the clamping devices 18 for attaching a run or a group of cables 35 to a supporting framework, the clamping devices enclosing the first layers of cables are attached to suitable base clamps adapted to be secured to the framework, as hereinbefore described. As shown in Figs. 1 and 2 the clamping devices 18 enclosing the first three layers of cables 35 are attached to base clamps 36, 36 secured to the cross channels 16. The base clamp 36, as shown in perspective in Fig. 7, may consist of flat strip material, preferably resilient sheet metal, formed into a three sided loop for enclosing a channel 16 and having the ends thereof bent inwardly as indicated at 37 for engaging the flanges of the channel. The top or horizontal portion of the base clamp is formed with an offset portion 38 provided with a rectangular slot 39 for accommodating a reduced extremity 27 of a clamping device 26. A flexible reed portion 40 extending into the slot 39 is adapted to selectively engage the transverse slots 29 of the reduced extremity 27 to provide vertical adjustment for accommodating various numbers and sizes of cables.

In attaching a run or group of cables to a supporting framework by means of the clamping devices 18, a pair of base clamps 36 are first clamped at predetermined positions along each or certain of the cross channels 16 and the cables are then arranged in horizontal layers along cross channels in the spaces defined by the base clamps. The clamping devices 18 are then placed around the cables and are pressed downwardly to firmly clamp the cables to the channels 16, the reduced extremities 27 of the clamping devices extending into the slots 39 of the base clamps and automatically becoming interlocked therein by the engagement of the flexible reed portions 40 with the transverse slots 29, as hereinbefore described. In similar manner, additional cables or groups of cables may be attached to the supporting framework by means of additional base clamps 34 secured to the channels 16 at predetermined positions spaced from the preceding base clamps. Also, when desired, additional layers or groups of cables may be superimposed upon previously installed groups thereof and may be readily and securely attached thereto by means of clamping devices 18 adapted to interlock with previously installed clamping devices.

When attaching a plurality of cables to a supporting framework, it is sometimes desirable to interlock the cables at positions where it is inconvenient to attach them to the framework. Thus, for example, in the embodiment of the invention illustrated in Fig. 1, it may be desirable to interlock the individual cables or groups of cables at a point intermediate the cross channels 16. This may be readily and conveniently accomplished by means of clamping devices embodying the present invention. As shown in Fig. 3, a plurality of cables 35 are enclosed within a pair of cooperating oppositely disposed clamping devices 18, one of which is disposed in an inverted position with its reduced extremities severed therefrom, as indicated at 42. The clamping devices are then pressed toward each other to securely clamp the enclosed cables to each other, the slotted extremities 27 of the upper clamping device extending into the slots 30 of the lower clamping device and automatically becoming interlocked therein by the flexible reed portions 40 of the lower clamping device in the manner hereinbefore described. The projecting ends of the extremities 27 of the upper clamping device may be bent over the horizontal portion of the lower clamping device as indicated at 43 (Fig. 3). If desired, clamping devices enclosing additional cables or groups of cables may be attached to the clamping devices enclosing previously supported groups of cables. In this manner, the individual cables or groups of cables may be securely interlocked at positions where it is inconvenient to attach them to the supporting framework.

The clamping device 20, as shown in detail in Figs. 8, 9 and 10, is similar to the clamping device 18 in that it also comprises a flat horizontal portion 45 interconnecting a pair of spaced vertical portions 46, 46 having reduced extremities 47, 47. The horizontal portion 45 is provided at each end with a transverse slot 48 for accommodating the reduced extremities 47 of a similar device. The horizontal portion 45 is slotted at each end, as indicated at 49, to provide flexible reed portions 50, 50 which extend into the transverse slots 48 and are adapted to selectively engage a plurality of spaced transverse teeth 52, 52 formed on the inner surfaces of the reduced extremities 47 to provide vertical adjustment for accommodating various numbers and sizes of cables.

Another form of clamping device embodying the features of the invention is shown in Figs. 11 and 12 and is designated generally by the reference numeral 22. It will be noted that this form of clamping device also comprises a flat horizontal portion 55 interconnecting a pair of spaced vertical portions 56, 56 having reduced extremities 57, 57. The horizontal portion 55 is provided at each end with a U-shaped slot 58 to provide longitudinally extending flexible reed portions 59, 59 for adjustably engaging the reduced extremities 57 of a similar device to provide vertical adjustment for accommodating various numbers and sizes of cables. It will be understood that the clamping devices 22 are securely interlocked solely by the frictional engagement of the reduced extremities 57 of one device with the flexible reed portions 59 of another device.

Another form of clamping device embodying the features of the invention is shown in Figs. 13 and 14 and is designated generally by the reference numeral 24. It will be observed that this form of clamping device comprises a flat horizontal portion 60 interconnecting a pair of spaced vertical portions 61, 61 having reduced extremities 62, 62 provided with a plurality of spaced edge teeth 63, 63. The horizontal portion 60 is provided at each end with a transverse slot 64 for accommodating the reduced extremities 62 of another similar device. Transverse flexible reed portions 65, 65 extend into the slots 64 and are adapted to selectively engage the edge teeth 63 of the reduced extremities 62 of a similar device to provide vertical adjustment for accommodating various numbers and sizes of cables.

It will be understood that suitable base clamps, similar to the base clamp 36, may be employed with each of the several alternative forms of clamping devices for facilitating the attachment of the first layers of cables to a supporting framework. It is to be understood, also, that the embodiments of the invention herein illustrated and described merely represent several useful forms of the invention which is capable of numerous other applications within the scope of the appended claims.

What is claimed is:

1. A clamping device comprising a horizontal portion and an integral vertical portion, the horizontal portion having a slot and a flexible reed portion terminating therein for adjustable interlocking engagement with the vertical portion of another member.

2. A clamping device comprising a horizontal portion and a vertical portion, the horizontal portion having a slot for accommodating the vertical portion of another member, and a flexible reed portion terminating in the slot for adjustable interlocking engagement with the vertical portion of the second member.

3. A cable clamping device comprising a vertical portion having a transverse slot and a horizontal portion formed with a horizontal projection for interlocking engagement with a corresponding slot in the vertical portion of another member.

4. A cable clamping device comprising a three sided loop member consisting of a horizontal portion interconnecting spaced vertical end portions, the horizontal portion having flexible reed portions for adjustable interlocking engagement with the vertical end portions of another member.

5. A cable clamping device comprising a horizontal portion and a vertical portion having a plurality of spaced transverse slots for adjustable interlocking engagement with a projection of a horizontal portion of another member to accommodate various numbers and sizes of cables.

6. A cable clamping device comprising a horizontal portion and a vertical portion having a plurality of spaced surface projections for selective engagement by the horizontal portion of another member to provide vertical adjustment.

7. A cable clamping device consisting of flat strip material formed into a three sided loop member comprising a horizontal portion interconnecting a pair of spaced vertical portions terminating in reduced extremities, the horizontal portion having transverse slots for accommodating the reduced extremities of a second member, and flexible reed portions extending into the slots for adjustable interlocking engagement with the reduced extremities of the second member.

8. A cable clamping device consisting of resilient sheet material formed into a U-shaped member comprising a horizontal portion interconnecting spaced vertical portions, the horizontal portion being slotted to provide flexible reed portions, and the vertical portions having a plurality of spaced transverse slots for selective interlocking engagement with the flexible reed portions of another member to provide vertical adjustment for accommodating various numbers and sizes of cables.

In witness whereof, we hereunto subscribe our names, this 19th day of April, A. D. 1929.

FERDINAND OUDIN.
BENJAMIN HARVEY SKINNER.